(12) United States Patent
Cho et al.

(10) Patent No.: US 12,118,032 B2
(45) Date of Patent: Oct. 15, 2024

(54) ELECTRONIC DEVICE FOR SEARCHING CONTENT AND CONTROL METHOD THEREFOR

(71) Applicant: SAMSUNG ELECTRONICS CO., LTD., Suwon-si (KR)

(72) Inventors: Eun-Ae Cho, Suwon-si (KR); Jinhyun Kim, Suwon-si (KR); Gihoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 903 days.

(21) Appl. No.: 17/059,000

(22) PCT Filed: May 10, 2019

(86) PCT No.: PCT/KR2019/005604
§ 371 (c)(1),
(2) Date: Nov. 25, 2020

(87) PCT Pub. No.: WO2019/231130
PCT Pub. Date: Dec. 5, 2019

(65) Prior Publication Data
US 2021/0263963 A1    Aug. 26, 2021

(30) Foreign Application Priority Data

May 29, 2018  (KR) .................. 10-2018-0061217

(51) Int. Cl.
*G06F 16/583*  (2019.01)
*G06F 16/55*  (2019.01)
(Continued)

(52) U.S. Cl.
CPC ............ *G06F 16/583* (2019.01); *G06F 16/55* (2019.01); *G06F 16/5854* (2019.01);
(Continued)

(58) Field of Classification Search
None
See application file for complete search history.

(56) References Cited

U.S. PATENT DOCUMENTS 8,781,742 B2  7/2014  Albrecht
9,053,115 B1  6/2015  Rosenberg et al.
(Continued)

FOREIGN PATENT DOCUMENTS

CN  104737160 A  6/2015
CN  105808665 A  7/2016
(Continued)

OTHER PUBLICATIONS

Sangkloy P, Lu J, Fang C, Yu F, Hays J. Scribbler: Controlling Deep Image Synthesis with Sketch and Color. arXiv e-prints. Dec. 2016:arXiv-1612. (Year: 2016).*

(Continued)

*Primary Examiner* — Vincent Rudolph
*Assistant Examiner* — Meredith Taylor
(74) *Attorney, Agent, or Firm* — Nixon & Vanderhye, P.C.

(57) ABSTRACT

A method for controlling an electronic device is disclosed. The method for controlling an electronic device comprises the steps of: receiving a sketch drawn by a user; acquiring at least one machine-generated image on the basis of the sketch by using an artificial intelligence model learned by an artificial intelligence algorithm; displaying the acquired at least one machine-generated image; receiving a user command for selecting one of at least one displayed machine-generated image, and searching for at least one piece of content corresponding to the image selected according to the user command; and providing the searched for at least one piece of content.

14 Claims, 13 Drawing Sheets

(51) Int. Cl.
  *G06T 11/20* (2006.01)
  *G06V 10/74* (2022.01)
  *G06V 10/774* (2022.01)

(52) U.S. Cl.
  CPC ............ *G06T 11/203* (2013.01); *G06V 10/74* (2022.01); *G06V 10/774* (2022.01)

(56) References Cited

U.S. PATENT DOCUMENTS

| | | | |
|---|---|---|---|
| 9,183,228 | B2 | 11/2015 | Wang et al. |
| 9,395,204 | B2 | 7/2016 | Albrecht |
| 9,417,086 | B2 | 8/2016 | Albrecht |
| 9,528,847 | B2 | 12/2016 | Albrecht |
| 2009/0307219 | A1* | 12/2009 | Bennett ............... G06F 16/5838 |
| 2010/0070878 | A1* | 3/2010 | Amento ............. H04N 21/8146 |
| | | | 715/751 |
| 2014/0104279 | A1 | 4/2014 | Albrecht |
| 2014/0107922 | A1 | 4/2014 | Albrecht |
| 2014/0108016 | A1 | 4/2014 | Albrecht |
| 2014/0279265 | A1 | 9/2014 | Bhardwaj |
| 2014/0288830 | A1 | 9/2014 | Albrecht |
| 2016/0189003 | A1 | 6/2016 | Liu et al. |
| 2016/0203194 | A1 | 7/2016 | Park |
| 2016/0239521 | A1 | 8/2016 | Park et al. |
| 2017/0004383 | A1* | 1/2017 | Lin ........................ G06F 18/22 |

FOREIGN PATENT DOCUMENTS

| | | |
|---|---|---|
| CN | 107209631 A | 9/2017 |
| CN | 107895028 A | 4/2018 |
| KR | 10-2012-0036649 | 4/2012 |
| KR | 10-2013-0059033 | 6/2013 |
| KR | 10-2013-0059058 | 6/2013 |
| KR | 10-1326083 | 11/2013 |
| KR | 10-2014-0079262 | 6/2014 |
| KR | 10-2015-0061390 | 6/2015 |
| KR | 10-1698096 | 1/2017 |
| KR | 10-2017-0092631 | 8/2017 |

OTHER PUBLICATIONS

Zhu, Jun-Yan, et al. "Generative visual manipulation on the natural image manifold." Computer Vision-ECCV 2016: 14th European Conference, Amsterdam, The Netherlands, Oct. 11-14, 2016, Proceedings, Part V 14. Springer International Publishing, 2016. (Year: 2016).*

Summons to attend oral proceedings dated Jun. 29, 2023 in European Patent Application No. 19812106.3.

Office Action dated Jul. 19, 2023 in Korean Patent Application No. 10-2018-0061217 and English-language translation.

Communication pursuant to Article 94(3) EPC dated Feb. 9, 2022 in EP Application No. 19 812 106.3.

Baldo Faieta, et al., "Visual Search by Brushing", Adobe, Adobe Systems Incorporated, 2017, 9 pages.

Yeong-Il Mo, et al., "A Study in Increasing the Efficiency of Image Search Using Image Attribute in the area of content-Based Image Retrieval", Transactions of the Korea Society for Stimulation, vol. 18, No. 2, Jun. 2009, pp. 39-48 with English Anstract.

International Search Report for PCT/KR2019/005604 dated Aug. 13, 2019, 5 pages with English Translation.

Written Opinion of the ISA for PCT/KR2019/005604 dated Aug. 13, 2019, 7 pages with English Translation.

Extended Search Report dated Dec. 10, 2020 in counterpart European Patent Application No. 19812106.3.

Tanase, Claudiu et al., "Semantic Sketch-Based Video Retrieval with Autocompletion," Intelligent User Interfaces, ACM, New York, NY, Mar. 7, 2016, pp. 97-101, 5 pages.

Sangkloy, Patsorn et al., "Scribbler: Controlling Deep Image Synthesis with Sketch and Color," Arxiv.Org, Cornell University Library, Ithaca, NY, Dec. 2, 2016, 13 pages.

Result of consultation dated Nov. 10, 2023 in European Patent Application No. 19812106.3.

Minutes of Oral Proceedings dated Dec. 19, 2023 in European Patent Application No. 19812106.3.

Decision to Refuse dated Dec. 20, 2023 in European Patent Application No. 19812106.3.

Rejection Decision dated Jan. 16, 2024 in Korean Patent Application No. 10-2018-0061217 and English-language translation.

Seddati, Omar et al., "DeepSketch: Deep Convolutional Neural Networks for Sketch Recognition and Similarity Search," IEEE, 2015, 6 pages, XP 33172449.

Office Action dated Feb. 28, 2024 in Chinese Patent Application No. 201980030966.0 and English-language translation.

Notice of Final Rejection dated Apr. 24, 2024 in Korean Patent Application No. 10-2018-0061217 and English-language translation.

Decision to Reject Amendment dated Apr. 24, 2024 in Korean Patent Application No. 10-2018-0061217 and English-language translation.

* cited by examiner

ELECTRONIC DEVICE FOR SEARCHING CONTENT AND CONTROL METHOD THEREFOR

This application is the U.S. national phase of International Application No. PCT/KR2019/005604 filed May 10, 2019 which designated the U.S. and claims priority to KR Patent Application No. 10-2018-0061217 filed May 29, 2018, the entire contents of each of which are hereby incorporated by reference.

BACKGROUND

Field

The disclosure relates to an electronic device and a control method therefor, and more particularly, relates to an electronic device for searching for a content more efficiently and conveniently using a sketch drawn by a user and a control method therefor.

The disclosure further relates to an artificial intelligence (AI) system simulating functions of the human brain such as recognition or determination using a machine learning algorithm, and an application thereof.

Description of Related Art

Recently, artificial intelligence systems with intelligence of a human level are used in various fields. In the artificial intelligence system, a machine trains, determines, and becomes smart itself, unlike a rule-based smart system of the related art. As the artificial intelligence system is used, a recognition rate is improved and preferences of a user can be more accurately understood. Thus, the rule-based smart system of the related art is gradually being replaced with the deep learning-based artificial intelligence system.

The artificial intelligence technologies may include machine learning (e.g., deep learning) and elementary technologies using the machine learning.

The machine learning may refer, for example, to an algorithm technology of self-classifying/self-training features of input data, and the elementary technology may refer, for example, to a technology of simulating functions of the human brain such as recognition or determination using the machine learning algorithm such as the deep learning and includes technical fields of language understanding, visual understanding, inference/prediction, knowledge representation, operation control, and the like.

Various fields, to which the artificial intelligence technologies are applied, are as follows. The language understanding may refer to a technology of recognizing languages/alphabets of human and applying/processing it and may include natural language processing, machine translation, a conversion system, question and answer, voice recognition/synthesis, and the like. The visual understanding may refer to a technology of recognizing an object in a view of human and processing it and may include object recognition, object tracking, image searching, human recognition, scene understanding, space understanding, image improvement, and the like. The inference/prediction may refer to a technology of identifying the information and logically inferring and predicting it and may include knowledge/possibility-based inference, optimization prediction, preference-based planning, recommendation, and the like. The knowledge representation may refer to a technology of performing automating processing of experiment information of human into knowledge data and includes knowledge construction (data generation/classification), knowledge management (data application), and the like. The operation control may refer to a technology of controlling automatic driving of a vehicle or movement of a robot and may include movement control (navigation, collision, or travelling), manipulation control (behavior control), and the like.

Meanwhile, in the related art, in order to search for a content on a device, it was necessary to search for the content with a keyword such as a file name or search for the content with user's own eyes using previews. In addition, it was necessary for a user to search for the content by generating metadata with information that is tagged piece by piece.

However, in such a keyword search method, the content is expressed only with a date of a file or a name designated by a user. Accordingly, it was difficult to search for an atmosphere or a color of an image/photograph and the method for tagging information piece by piece by a user was inconvenient.

SUMMARY

The disclosure has been made in view of the above-mentioned problems and an object of the disclosure is to provide an electronic device for searching for a content more efficiently and conveniently using a sketch drawn by a user and a control method therefor.

According to an aspect of the disclosure, there is provided a method for controlling an electronic device, the method including receiving a sketch drawn by a user, obtaining at least one machine-generated image based on the sketch using an artificial intelligence model trained by an artificial intelligence algorithm, displaying the at least one obtained machine-generated image, receiving a user command for selecting one of the at least one displayed machine-generated image and searching for at least one content corresponding to an image selected according to the user command, and providing the at least one searched content.

The searching may include searching for at least one content corresponding to the selected image among a plurality of contents stored in the electronic device.

The method for controlling the electronic device according to the embodiment may further include displaying at least one UI element for selecting a category based on information obtained by classifying the plurality of contents, and the obtaining may include inputting information regarding a category corresponding to a UI element selected by the user from the at least one UI element and the sketch to the artificial intelligence model and obtaining at least one image refined from the sketch as a target belonging to the category corresponding to the selected UI element.

The searching may include searching for at least one content corresponding to the information regarding the category corresponding to the selected UI element and the selected image.

The obtaining may include inputting information regarding a plurality of categories obtained by classifying the plurality of contents and the sketch to the artificial intelligence model and obtaining a plurality of images refined from the sketch with respect to each of the plurality of categories.

The displaying may include displaying the plurality of obtained images for each category.

The artificial intelligence model may be trained by a generative adversarial network (GAN) or variational autoencoder (VAE).

The searching may include searching for at least one content corresponding to an image selected according to the user command using an artificial intelligence model for content search trained by the artificial intelligence algorithm.

The method for controlling the electronic device according to the embodiment may further include retraining the artificial intelligence model for content search based on a content selected by the user among the at least one provided content.

The receiving the sketch drawn by the user may include receiving a signal corresponding to a movement of a remote controller and obtaining information regarding the sketch based on the received signal.

In accordance with another aspect of the disclosure, there is provided an electronic device including a memory storing computer executable instructions, a display, and a processor, by executing the computer executable instructions, configured to obtain at least one machine-generated image based on a sketch drawn by a user using an artificial intelligence model trained by an artificial intelligence algorithm, control the display to display the at least one obtained machine-generated image, receive a user command for selecting one of the at least one displayed machine-generated image, and search for at least one content corresponding to an image selected according to the user command, and provide the at least one searched content.

The processor may be configured to search for at least one content corresponding to the selected image among a plurality of contents stored in the electronic device.

The processor may be configured to control the display to display at least one UI element for selecting a category based on information obtained by classifying the plurality of contents, input information regarding a category corresponding to a UI element selected by the user from the at least one UI element and the sketch to the artificial intelligence model and obtain at least one image refined from the sketch as a target belonging to the category corresponding to the selected UI element.

The processor may be configured to search for at least one content corresponding to the information regarding the category corresponding to the selected UI element and the selected image.

The processor may be configured to input information regarding a plurality of categories obtained by classifying the plurality of contents and the sketch to the artificial intelligence model and obtain a plurality of images refined from the sketch with respect to each of the plurality of categories.

The processor may configured to control the display to display the plurality of obtained images for each category.

The artificial intelligence model may be trained by a generative adversarial network (GAN) or variational autoencoder (VAE).

The processor may be configured to search for at least one content corresponding to an image selected according to the user command using an artificial intelligence model for content search trained by the artificial intelligence algorithm.

The processor may be configured to retrain the artificial intelligence model for content search based on a content selected by the user among the at least one provided content.

The electronic device according to the embodiment may further include a communicator, and the processor may be configured to receive a signal corresponding to a movement of a remote controller via the communicator and obtain information regarding the sketch based on the received signal.

DETAILED DESCRIPTION

Figure 1:
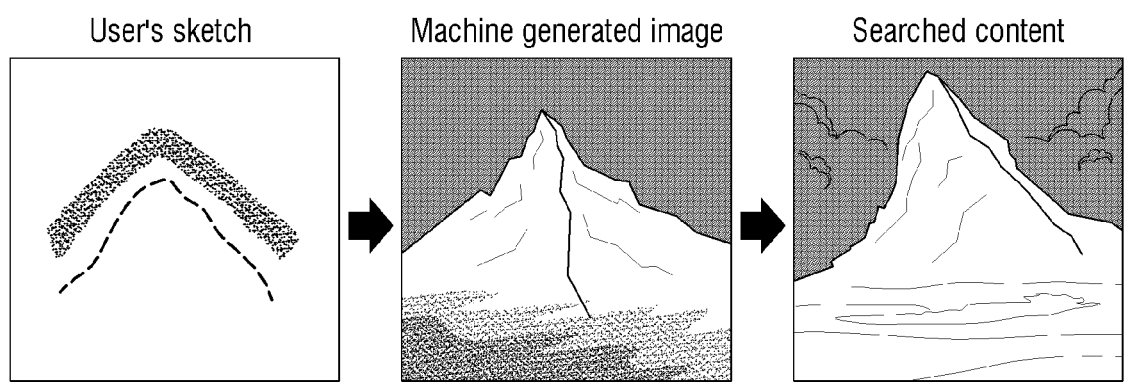
FIG. 1 is a view for illustrating a content providing method according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements. For example, a first user device and a second user device may represent user devices different from each other, regardless of order and/or importance. For example, a first element may be referred to as a second element and the second element may also be similarly referred to as the first element, while not departing from the scope of a right of the disclosure.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to" does not necessarily refer to a device being "specifically designed to" in terms of hardware. Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The terms used in the disclosure are merely used to describe specific embodiments and may not be used to limit the scope of other embodiments. Unless otherwise defined specifically, a singular expression may encompass a plural expression. The terms used herein including technical or scientific terms may refer to the same terms generally understood by those skilled in the art in the technical field of the disclosure. The terms defined in normal dictionaries among the terms used in the disclosure may be interpreted as the same or similar meanings in the related technologies and are not interpreted as ideal or excessively formal meanings. In some cases, the terms defined in the disclosure may not be interpreted to exclude the embodiments of the disclosure.

An electronic device according to various embodiments of the disclosure may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, a wearable device, and the like. According to various embodiments, a wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implant type (implantable circuit).

In some embodiments, the electronic device may be a home appliance. The home appliance may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, SAMSUNG One Connect Box™, APPLE TV™, or GOOGLE TV™), a game console (e.g., XBOX™, PLAYSTATION™), an electronic dictionary, an electronic key, a camcorder, an electronic frame, or the like.

In other embodiments, the electronic device may include at least one of a variety of medical devices (e.g., various portable medical measurement devices such as a blood glucose meter, a heart rate meter, a blood pressure meter, or a temperature measuring device, magnetic resonance angiography (MRA), magnetic resonance imaging (MRI), or computed tomography (CT) scanner, or ultrasonic wave device, etc.), a navigation system, a global navigation satellite system (GNSS), an event data recorder (EDR), a flight data recorder (FDR), an automotive infotainment device, a marine electronic equipment (e.g., marine navigation devices, gyro compasses, etc.), avionics, a security device, a car head unit, industrial or domestic robots, an automatic teller's machine (ATM) of financial institution, a point of sale of (POS) a store, or an Internet of Things (IoT) device (e.g., light bulbs, sensors, sprinkler devices, fire alarms, thermostats, street lights, toasters, exercise equipment, hot water tanks, heater, boiler, etc.).

According to some embodiments, the electronic device may include at least one of a part of furniture, building/structure, an electronic board, an electronic signature receiving device, a projector, or various measurement devices (e.g., water, electric, gas, or wave measurement devices). According to various embodiments, the electronic device may be one of various devices described above or a combination of two or more thereof. The electronic device according to some embodiments may be a flexible electronic device. In addition, the electronic device according to an embodiment of the disclosure is not limited to the devices described above and may include a new electronic device in accordance with technology development.

Hereinafter, a method for searching for a content based on a sketch roughly drawn by a user will be described according to various embodiments of the disclosure. FIG. 1 is a view for illustrating an example of a content providing method according to the disclosure.

Referring to FIG. 1, a sketch roughly drawn by a user is input. The sketch may be formed of at least one of a contour (dotted line) and a color (illustrated above the dotted line). An image file may be input or a user may directly draw a sketch on an electronic device using an electronic pen.

A machine-generated image may be obtained based on the sketch drawn by the user using an artificial intelligence model trained using an artificial intelligence algorithm. The artificial intelligence model may be trained to have a criterion for generating an image refined from a sketch. A mountain and the sky are expressed in a machine-generated image illustrated in FIG. 1 based on a user's sketch which has designated a contour that is sharp upwards and a color (e.g., sky blue) above the contour.

A content corresponding to the machine-generated image may be provided. For example, referring to FIG. 1, a photograph content obtained by capturing the sky and the mountain which is similar to the machine-generated image may be searched for.

For the content search, at least one of text-based image retrieval (TBIR) and content-based image retrieval (CBIR) may be used. The text-based image retrieval method may include, for example, a method for extracting a feature from a machine-generated image, identifying a keyword corresponding to the extracted feature, and searching for a content having a file name and metadata including the identified keyword. The content-based image retrieval method may include, for example, a method for digitizing and comparing visual elements such as a color, a texture, a shape, and the like of an image. The content-based image retrieval method may be used for a video content retrieval. For example, a certain scene of a video content may be compared with a machine-generated image, and in another example, a representative image of a video content (e.g., film poster, if the video content is a film) may be compared with a machine-generated image.

In the content search, an artificial intelligence model trained by an artificial intelligence algorithm may be used. A content corresponding to the machine-generated image may be searched for by inputting the machine-generated image to the artificial intelligence model.

The content search method according to various embodiments of the disclosure may be implemented via the electronic device. Hereinafter, a method for controlling the electronic device according to an embodiment of the disclosure will be described with reference to FIG. 2.

Figure 2:
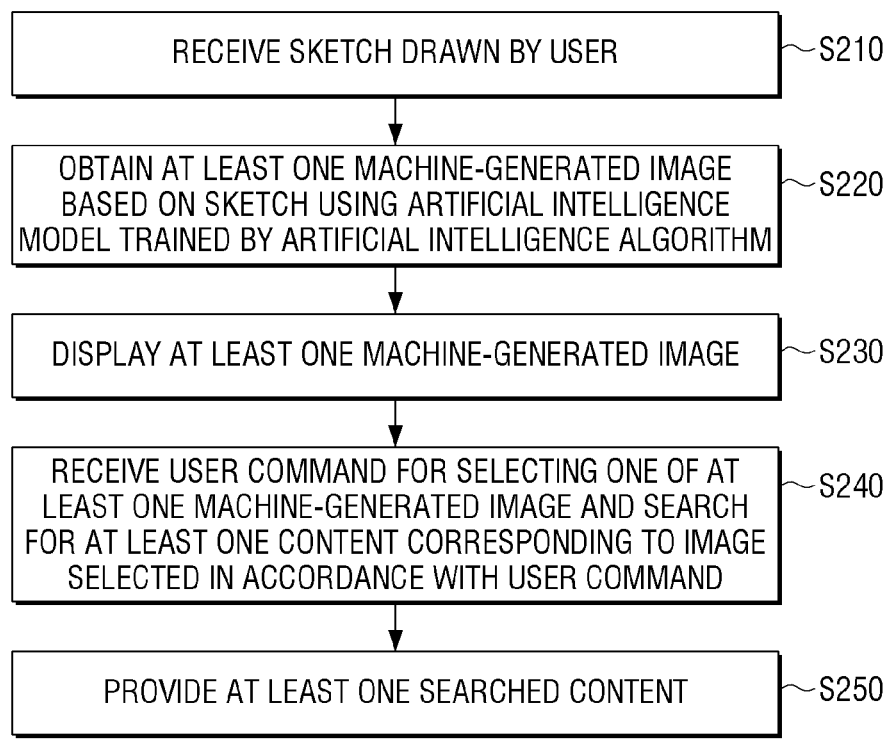
FIG. 2 is a flowchart for illustrating a method for controlling an electronic device according to an embodiment.

FIG. 2 is a flowchart for illustrating a method for controlling an electronic device according to an embodiment.

Referring to FIG. 2, the electronic device may receive a sketch drawn by a user (S210).

The electronic device according to an embodiment of the disclosure may receive the sketch drawn by the user on an external device from the external device. For example, the electronic device according to an embodiment of the disclosure is a TV and the TV may receive the sketch drawn by the user on an external device such as a smartphone.

The electronic device according to another embodiment of the disclosure may directly receive a sketch from the user. For example, the sketch may be input by a touch input method or an input method using a mouse, a keyboard, a joystick, a remote controller, or the like.

Figure 3:
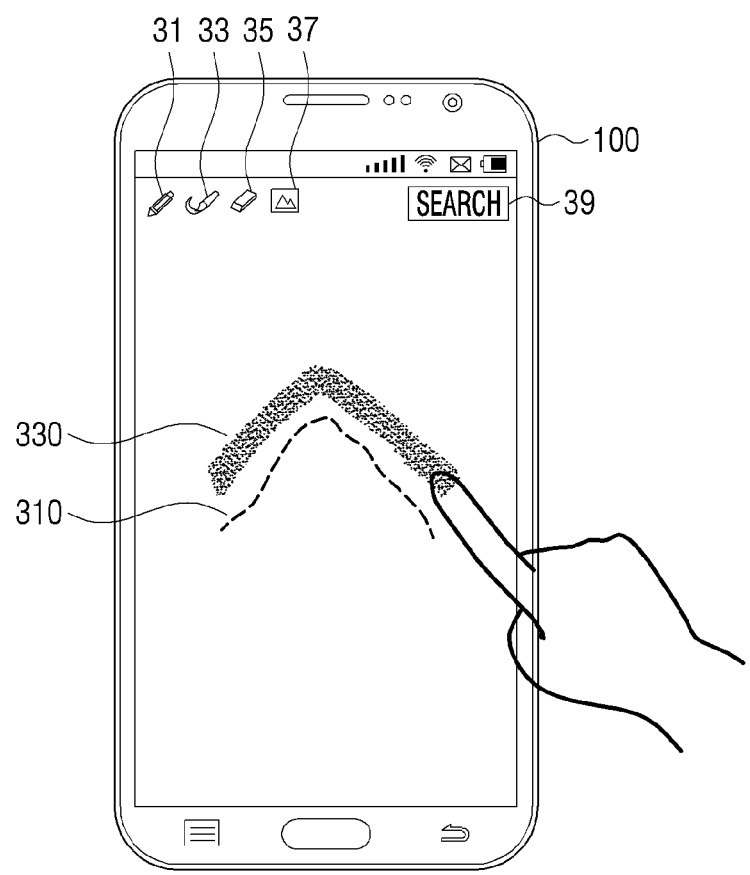
FIGS. 3 and 4 are views for illustrating various embodiments of the disclosure in which the electronic device receives a sketch.
Figure 4:
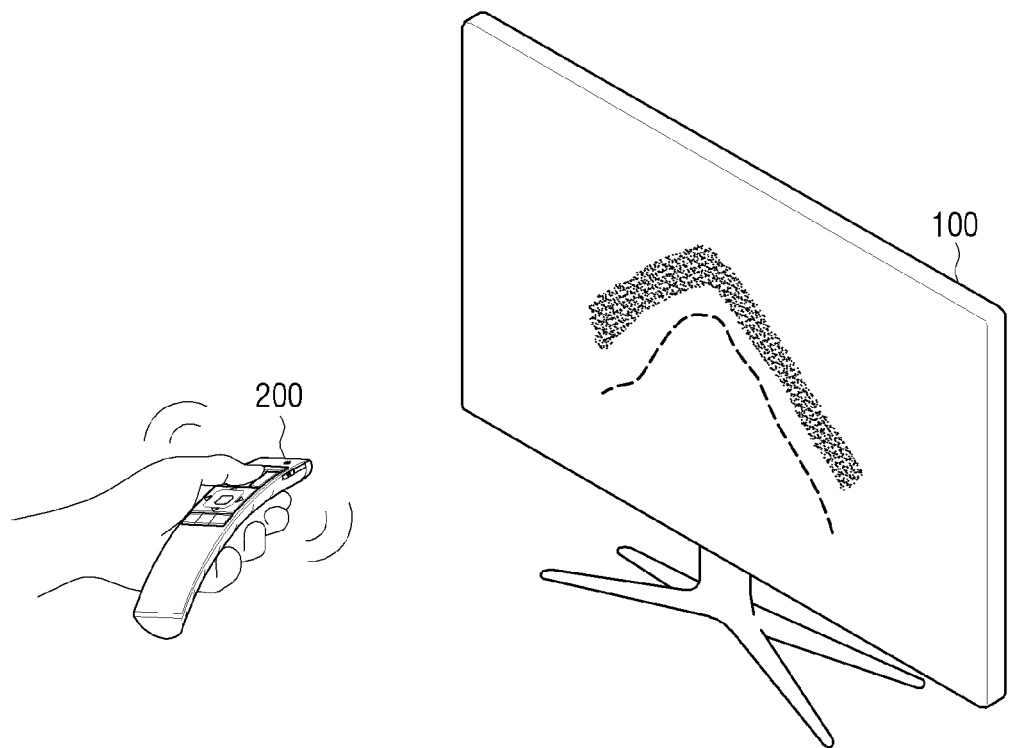

FIGS. 3 and 4 are views for illustrating sketch input methods according to some embodiments of the disclosure.

FIG. 3 illustrates an example in which an electronic device 100 according to an embodiment of the disclosure receives a sketch by the touch input method.

Referring to FIG. 3, the electronic device 100 may include a touch screen and may provide a canvas user interface (UI). The canvas UI may include various UI elements. For example, the canvas UI may include a contour drawing UI element 31, a color painting UI element 33, a remover UI element 35, an image file uploading UI element 37, and a search execution UI element 39.

The user may draw a sketch using a finger or a pen (e.g., stylus pen) on the touch screen of the electronic device 100. For example, a contour 310 may be drawn with the touch after selecting the contour drawing UI element 31, and a color 330 may be painted with the touch after selecting the color painting UI element 33. When drawing a sketch using a pen, for example, a stylus pen, the contour, the color painting, the remover, and the like may be selected with a button provided on the pen.

When the search execution UI element 39 is selected after completing the sketch, a machine-generated image may be obtained based on the sketch and the content search may be performed.

Meanwhile, when the image file uploading UI element 37 is selected and an image file stored in the electronic device 100 is selected, the content search may be performed based on the selected image file. In other words, the content search may be performed without directly drawing the sketch by the user. In addition, an uploaded image file may be displayed on the canvas UI, the user may additionally edit the image by adding a sketch or removing a part of the image with the remover UI element 35, and the content search may be performed based on the additionally edited image.

The content search may be performed on the electronic device 100 or on an external device (e.g., server). In the latter case, the electronic device 100 may transmit information regarding the input sketch or the uploaded image file to the external device and the content search may be performed on the external device.

FIG. 4 illustrates an example of remotely inputting a sketch to the electronic device 100 according to another embodiment of the disclosure.

Referring to FIG. 4, the electronic device 100 may communicate with a remote controller 200. The remote controller 200 may detect a movement of the remote controller 200 in the XYZ space and transmit a signal regarding detected three-dimensional movement to the electronic device 100.

In this case, the remote controller 200 may provide a pointing mode based on an absolute coordinate method for calculating a position of the remote controller 200 absolutely moved with respect to a predetermined reference or a relative coordinate method for calculating a position of the remote controller 200 relatively moved using a current position as a reference.

The remote controller 200 may include at least one of an acceleration sensor, a gyro sensor, and a geomagnetic sensor. Various sensors included in the remote controller 200 may detect a spatial movement of the remote controller 200 with one or a combination of two or more thereof.

For example, the acceleration sensor may detect at least one of a change in acceleration and a change in angular acceleration occurred when moving the remote controller 200 by the user, the gyro sensor may detect a rotation angular speed of the remote controller 200, and the geomagnetic sensor may detect a magnetic field formed in a north-south direction of a sphere and measure an azimuth.

The remote controller 200 may transmit a signal corresponding to the movement of the remote controller 200 to the electronic device 100 by various communication methods such as Bluetooth (BT), wireless fidelity (Wi-Fi), infrared (IR), serial interface, universal serial bus (USB), and the like.

Referring to FIG. 4, the electronic device 100 may receive a sketch based on a signal received from the remote controller 200.

As described above with reference to FIG. 3, the electronic device 100 of FIG. 4 may provide UI elements such as a contour drawing UI element, a color painting UI element, a remover UI element, a search execution UI element, and the like and the user may draw a sketch by selecting the UI elements provided to the electronic device 100 via the remote controller 200. For example, the user may select the contour drawing UI element displayed on the electronic device 100 by moving the remote controller 200 or selecting an arrow key and may draw a contour on the electronic device 100 by moving the remote controller 200. In addition, the remote controller 200 may include buttons for contour drawing, color painting, and the like (physical buttons or soft buttons provided via a touch screen provided on the remote controller 200), and the user may draw a sketch on the electronic device 100 by selecting the buttons provided on the remote controller 200 and then moving the remote controller 200.

The electronic device which has received the sketch drawn by the user may obtain at least one machine-generated image based on the sketch using an artificial intelligence model trained by an artificial intelligence algorithm (S220).

The artificial intelligence model may be trained by a generative adversarial network (GAN) or variational auto-encoder (VAE).

According to an embodiment of the disclosure, the electronic device may obtain the machine-generated image using the artificial intelligence model stored in the electronic device. According to another embodiment, the electronic device may obtain the machine-generated image using the artificial intelligence model stored in an external server. In the latter case, the electronic device may transmit information regarding the sketch drawn by the user to the external server and receive the machine-generated image from the external server.

The electronic device may display the at least one machine-generated image (S230). The electronic device according to an embodiment of the disclosure may display the at least one machine-generated image via its own display or may transmit the at least one machine-generated image to an external display device so that the at least one machine-generated image is displayed on the external display device.

The electronic device may receive a user command for selecting one of the at least one machine-generated image and search for at least one content corresponding to the image selected according to the user command (S240). The electronic device may provide the at least one searched content (S250).

According to still another embodiment, the process in which the at least one machine-generated image is displayed and any one image of these is selected by the user may be omitted. In other words, when the sketch drawn by the user is received, the electronic device may directly obtain the machine-generated image based on this and search for at least one content corresponding to the machine-generated image.

There is no limitation to contents to be searched for. As a non-limiting example, a photograph similar to the machine-generated image, a video clip having a scene similar to the machine-generated image, information regarding a person with a face similar to the machine-generated image, information regarding a place similar to the machine-generated image, a result obtained by the internet search based on the machine-generated image, a drama, a film, or an animation having a poster similar to the machine-generated image, and the like may be searched for and provided.

The content to be searched for may be contents stored in the electronic device. According to an embodiment, the user may designate a folder for executing the content search by himself. According to another embodiment, the content to be searched for may be a content of an external source not stored in the electronic device. For example, the content provided from the Internet may be searched for.

The electronic device according to an embodiment of the disclosure may execute the search by itself. The electronic device according to another embodiment of the disclosure may search the external device by transmitting the information regarding the machine-generated image to the external device.

The electronic device according to an embodiment of the disclosure may search for a content corresponding to the machine-generated image using the artificial intelligence model for content search trained by the artificial intelligence algorithm.

The artificial intelligence model for the content search may be retrained based on a content selected by the user among at least one content that is searched for and provided. For example, a weight value may be applied to the content selected by the user and the artificial intelligence model for the content search may be retrained using this. History information regarding which content is selected by the user may be stored. Since the artificial intelligence model for the content search is retrained based on such history information, the artificial intelligence model may be specialized (or personalized) for the user and accuracy may increase, as it is used.

FIGS. 5 to 8 are views for illustrating user interfaces (UIs) provided by the electronic device 100 according to various embodiments which provides a function for searching for a content based on a sketch.

Figure 5:
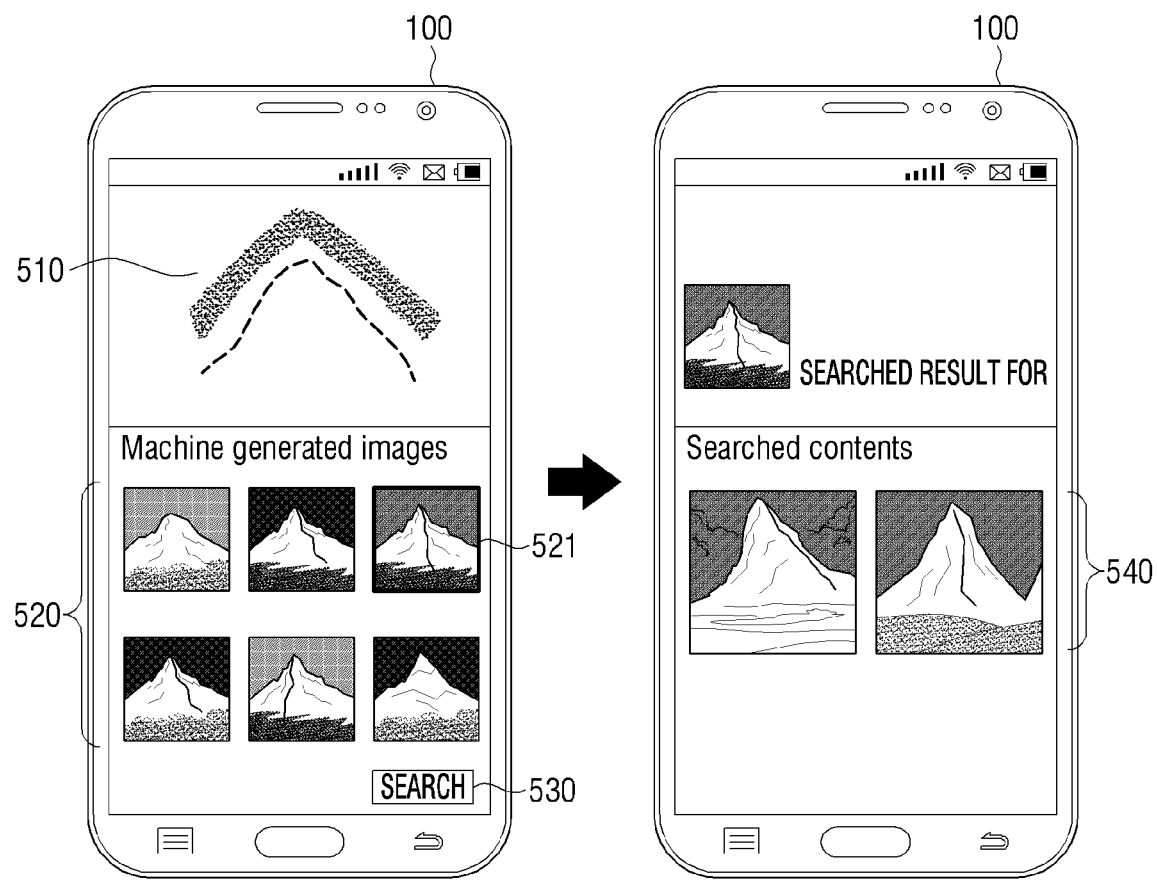
FIGS. 5, 6, 7, and 8 are views for illustrating user interfaces (UIs) provided by the electronic device according to various embodiments.

Referring to FIG. 5, a UI provided by the electronic device 100 may include a region for drawing a sketch and a region for displaying at least one machine-generated image. The electronic device 100 may display at least one machine-generated image 520 based on a sketch 510 drawn by the user using the artificial intelligence model trained by the artificial intelligence algorithm.

The at least one machine-generated image may be displayed in real time according to a sketch drawn in the region for drawing the sketch. Accordingly, when the sketch is edited, the edited part may be input to the artificial intelligence model in real time and the image may be edited and displayed in real time.

The at least one machine-generated image 520 may be arranged and displayed in the order from a highest score (or in the order from a highest similarity).

When a user command for selecting one of the at least one machine-generated image 520 is received, a graphic effect distinct from the other images may be displayed on an image 521 selected by the user. For example, referring to FIG. 5, a bold contour may be displayed on a periphery of the selected image 521.

When the user selects a UI element 530 for executing the search, at least one content 540 corresponding to the selected image 521 may be searched for and provided. When any one of the searched contents 540 is selected by the user, for example, the corresponding content may be enlarged and displayed. If a content selected by the user is a video content, the video may be reproduced. Meanwhile, the information for the content selected by the user among the searched contents 540 may be used for retraining the artificial intelligence algorithm used for the content search.

Figure 6:
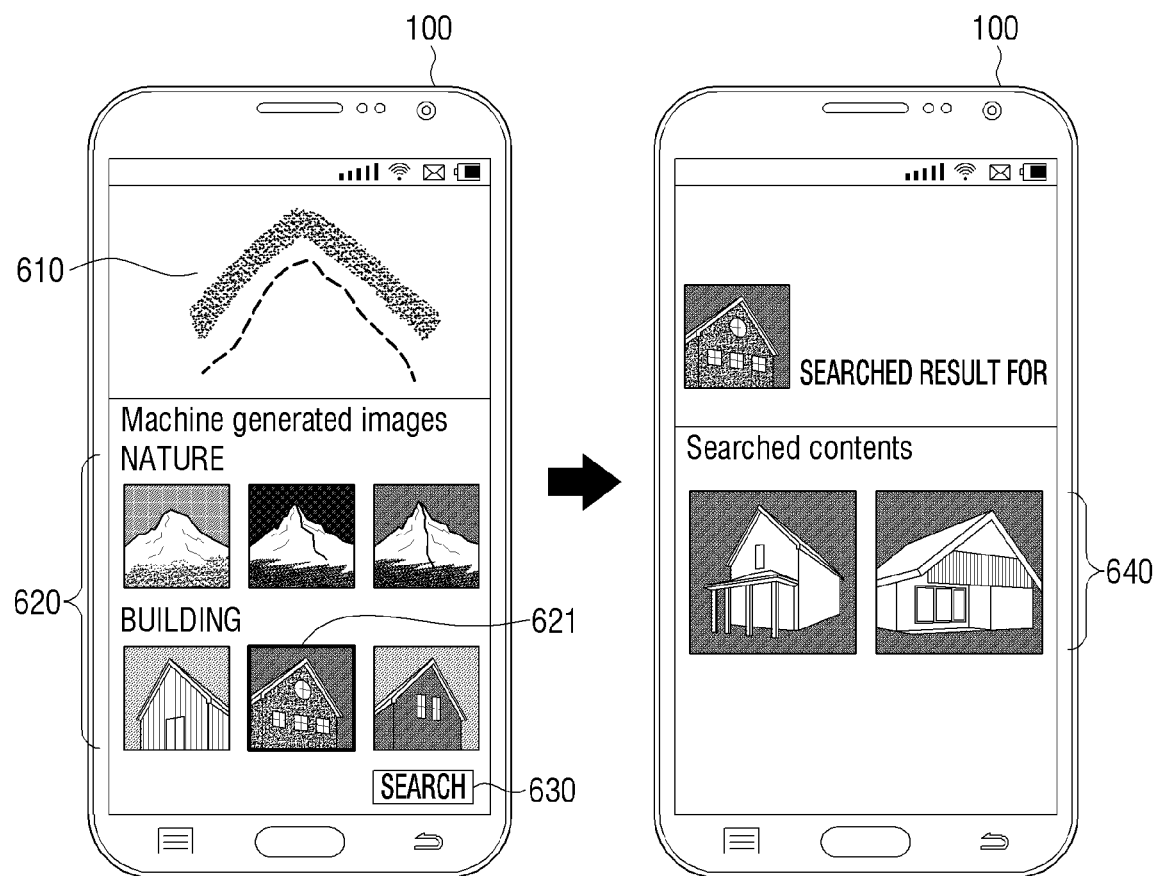

FIG. 6 is a view for illustrating UIs provided by the electronic device according to another embodiment of the disclosure.

Referring to FIG. 6, the electronic device 100 may display at least one machine-generated image 620 based on a sketch 610 drawn by the user using the artificial intelligence model trained by the artificial intelligence algorithm.

In this case, the artificial intelligence model may be trained based on different criteria depending on a category. Accordingly, although the same sketch is input, the artificial intelligence model may generate different images in accordance with the category. For example, referring to FIG. 6, images refined from the sketch 610 as targets belonging to a nature category and images refined from the sketch 610 as targets belonging to a building category may be generated.

According to an embodiment, the user may designate images in which category are to be generated in advance. In other words, the electronic device 100 may input information regarding a plurality of categories and the sketch drawn by the user to the artificial intelligence model and obtain a plurality of images refined from the sketch with respect to each of the plurality of categories. In this case, the information regarding the plurality of categories may be obtained by classifying contents to be searched for. For example, if the target to be searched for is a content stored in the electronic device 100, the information regarding the plurality of categories may be obtained based on the information obtained by classifying the plurality of contents stored in the electronic device 100.

For example, the electronic device 100 may classify the contents into the nature category and the building category based on metadata of the contents stored in the electronic device 100, input the information regarding such classified categories and the sketch 610 to the artificial intelligence model, and obtain images refined as targets belonging to the nature category and images refined as targets belonging to the building category.

The electronic device 100 may display images for each category. In other words, referring to FIG. 6, the electronic device 100 may distinguish and display images illustrated as targets belonging to the nature category and images illustrated as targets belonging to the building category.

When the user selects any one image 621 among the at least one machine-generated image 620 and selects a search execution UI element 630, at least one content 640 corresponding to the selected image 621 may be searched for and provided.

Figure 7:
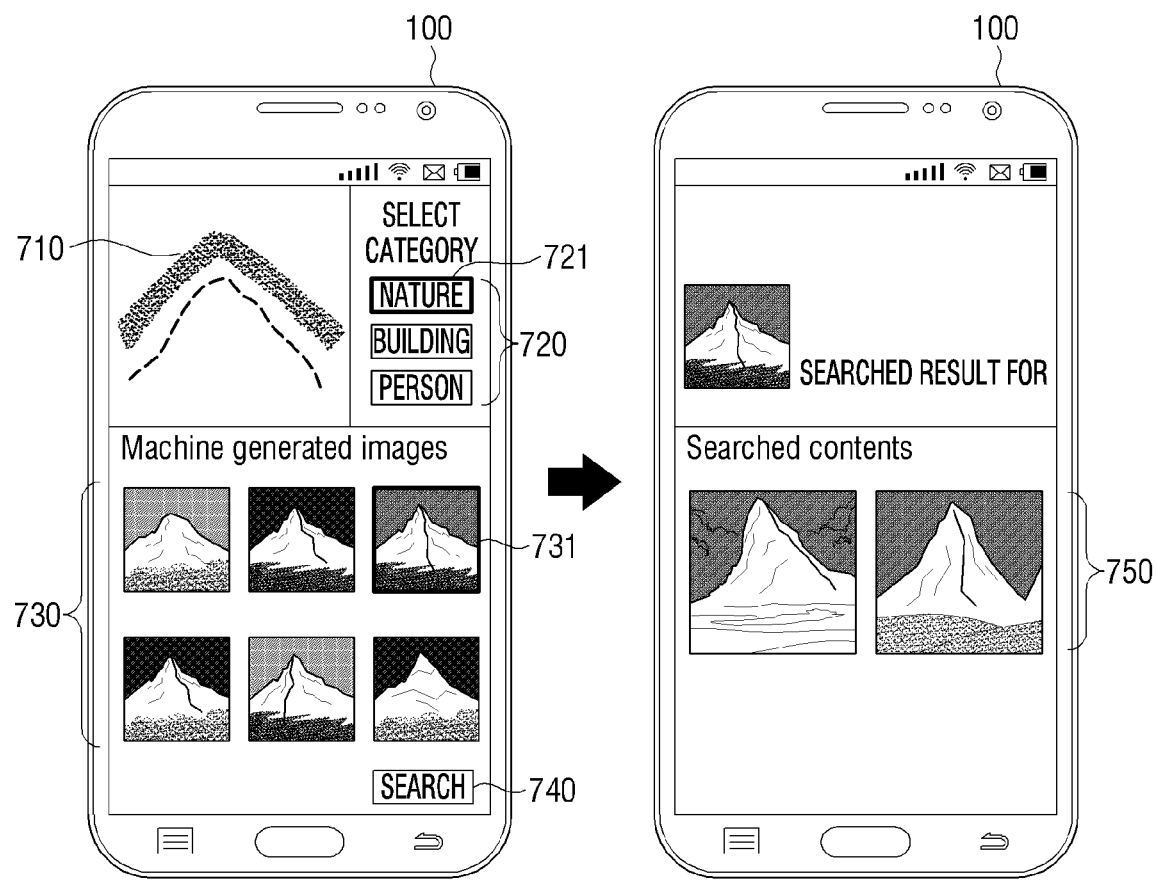

FIG. 7 is a view for illustrating a UI provided by the electronic device according to still another embodiment of the disclosure.

Referring to FIG. 7, the electronic device 100 may display at least one UI element 720 for selecting a category.

The at least one UI element 720 for selecting the category may be displayed based on a result of classification of the contents to be searched for. For example, when a target to be searched for is a content stored in the electronic device 100, the at least one UI element 720 may be displayed based on information obtained by classifying a plurality of contents stored in the electronic device 100. For example, referring to FIG. 7, when photograph contents stored in the electronic device 100 are classified into the nature category, the building category, and the person category, a UI element corresponding to the nature category, a UI element corresponding to the building category, and a UI element corresponding to the person category may be displayed.

The electronic device 100 may input the information regarding the category corresponding to a UI element 721 selected by the user from the at least one UI element 720 and a sketch 710 to the artificial intelligence model and obtain at least one image 730 refined from the sketch 710 as a target belonging to the category corresponding to the selected UI element 721.

When the user selects any one image 731 from the at least one machine-generated image 730 and selects a UI element 740 for search execution, at least one content 750 corresponding to the information regarding the category corresponding to the UI element 721 selected by the user and the selected image 731 may be searched for. In other words, the category information corresponding to the UI element 721 selected by the user may be used for filtering the searched result. Accordingly, photograph contents 750 corresponding to the nature category may be searched for and provided from photograph contents similar to the selected image 731. When the content is searched on an external device (for example, server), the information regarding the category and the information regarding the selected image may be transmitted to the external device and the external device may search for a content corresponding to the selected image using information regarding the category.

Figure 8:
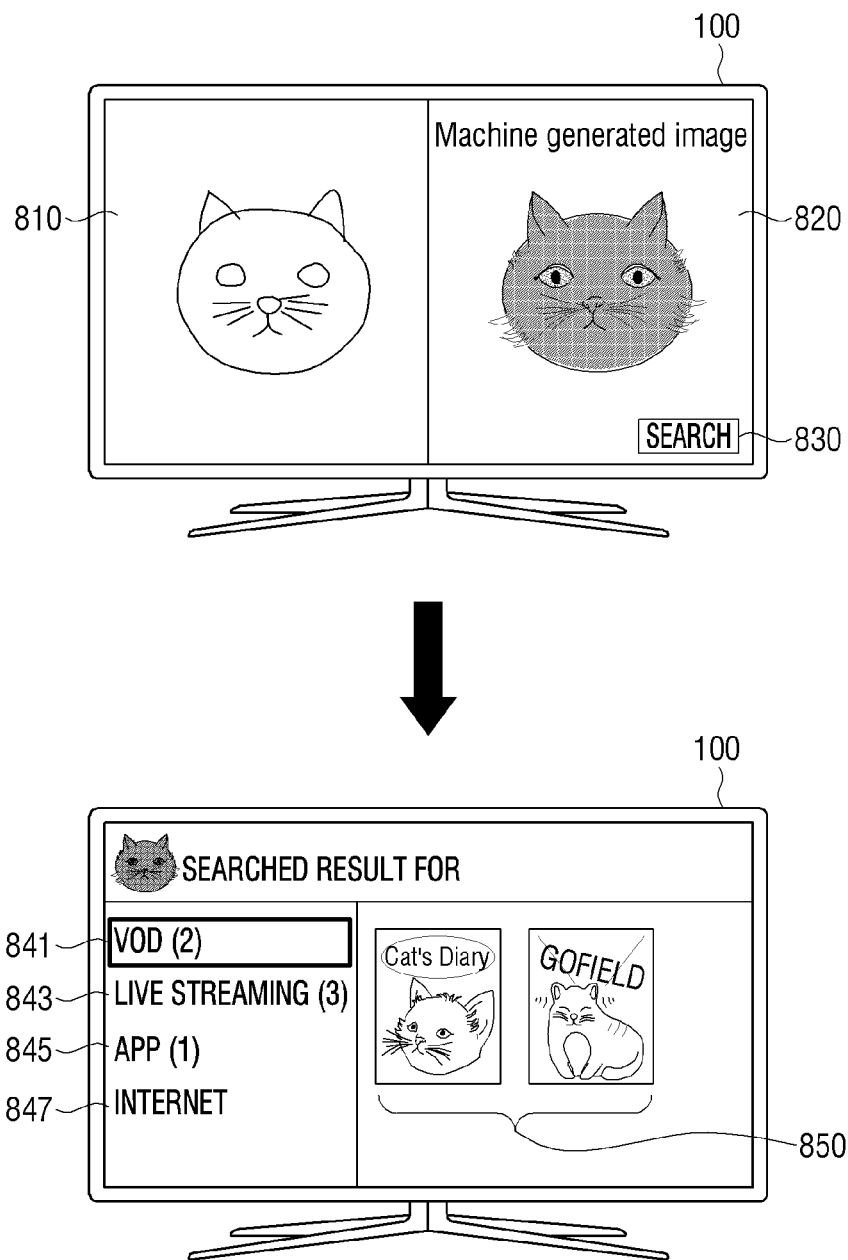

FIG. 8 is a view for illustrating UIs provided by the electronic device according to still another embodiment of the disclosure.

Referring to FIG. 8, the electronic device 100 may display a machine-generated image 820 based on a sketch 810 drawn by the user using an artificial intelligence model trained by an artificial intelligence algorithm.

When the user selects the UI element 830 for search execution, at least one content corresponding to the machine-generated image 820 may be searched for and provided.

In this case, contents of various sources may be searched for. For example, when the electronic device 100 is an internet protocol television (IPTV) for providing a digital television service to a consumer using an internet protocol, a video on demand (VOD) content, a real-time streaming content, an application, an Internet content (for example, result searched on GOOGLE™), and the like may be searched for and provided.

According to an embodiment, referring to FIG. 8, a searched result may be provided for each content source. A UI element 841 corresponding to the video on demand (VOD) content, a UI element 843 corresponding to the real-time streaming content, a UI element 845 corresponding to the application, and a UI element 847 corresponding to the Internet content may be displayed. Herein, for example, when a UI element 841 corresponding to the video on demand (VOD) content is selected, the searched VODs 850 may be provided. When any one of the searched VODs 850 is selected, the selected VOD may be reproduced or a screen for payment for the VOD may be provided.

Figure 9:
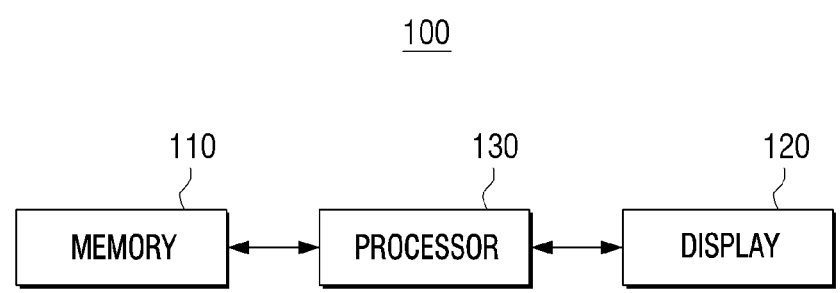
FIG. 9 is a block diagram for illustrating a configuration of the electronic device according to an embodiment.

FIG. 9 is a block diagram for illustrating a configuration of the electronic device 100 according to an embodiment of the disclosure. The electronic device 100 may perform operations of the examples with reference to FIGS. 1 to 8.

Referring to FIG. 9, the electronic device 100 may include a memory 110, a display 120, and a processor 130. Although not illustrated according to the embodiment, the electronic device 100 may further include suitable hardware/software elements apparent to those skilled in the art.

The memory 110 may include, for example, an internal memory or an external memory. Examples of the internal memory may include at least one of a volatile memory (e.g., dynamic RAM (DRAM), a static RAM (SRAM), or a synchronous dynamic RAM (SDRAM)) and a non-volatile memory (e.g., one time programmable ROM (OTPROM), programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard disk drive, or a solid state drive(SSD)).

The external memory may include a flash drive, for example, a compact flash (CF), secure digital (SD), micro secure digital (Micro-SD), mini secure digital (Mini-SD), extreme digital (xD), multi-media card (MMC), or a memory stick. The external memory may be functionally and/or physically connected to the electronic device 100 via various interfaces.

The memory 110 may be accessed by the processor 130 and reading, recording, editing, deleting, or updating of the data by the processor 130 may be executed. A term, memory, in the disclosure may include the memory 110, a ROM and RAM in the processor 130, or a memory card (e.g., micro SD card or memory stick) mounted on the electronic device 100.

The memory 110 may store computer executable instructions for executing a control method of the electronic device according to the embodiment with reference to FIGS. 2 to 8.

The memory 110 may store the artificial intelligence model according to the embodiment with reference to FIGS. 1 to 8. The artificial intelligence model may be trained on an external server and provided to the electronic device 100. The electronic device 100 may download the artificial intelligence model from the external server and store the artificial intelligence model in the memory 110, and when the artificial intelligence model is updated (or retrained), the electronic device 100 may receive the updated artificial intelligence model from the external server and store the artificial intelligence model. The electronic device 100 may be connected to such an external server via a local area network (LAN) or the Internet network.

According to an embodiment, the memory 110 may be implemented as an external server of the electronic device 100 such as a cloud server.

The display 120 may be an element for displaying an image. For example, the display 120 may display a UI screen for receiving a sketch and providing a searched result of the sketch. The UI screen may include UI elements such as a text, an image, an icon, a symbol, or the like.

The display 120 may include, for example, a liquid crystal display (LCD), a light-emitting diode (LED) display, an organic light-emitting diode (OLED) display (e.g., an active-matrix organic light-emitting diode (AMOLED), a passive-matrix OLED (PMOLED), a microelectromechanical systems (MEMS) display, or an electronic paper.

The display 120 may include a touch screen and may receive, for example, a touch using an electronic pen or a part of the body of the user, a gesture, an approximate or hovering input.

Meanwhile, the display 120 may be omitted in the electronic device 100. In this case, the electronic device 100 may transmit an image signal to an external display device to display an image on the external display device.

The electronic device 100 may include an input device and receive various user inputs via the input device. The input device may include, for example, a button, a touch panel, a sensor or a camera for receiving a motion input, a microphone for receiving a voice input, and the like.

According to a still another embodiment, the electronic device 100 may be connected to an external input device to receive various user inputs via the external input device. For example, the external input device may include a keyboard, a mouse, a smartphone, a remote controller, and the like. The electronic device 100 may be connected to the external input device in a wired or wireless manner. For example, the electronic device 100 may be connected to the external input device in a wired manner via a USB port or the like. As another example, the electronic device 100 may be connected to the external input device in a wireless manner by communication methods such as infrared Data Association (IrDA), Radio Frequency Identification (RFID), Wireless Fidelity (Wi-Fi), Wi-Fi Direct, Bluetooth (e.g., Bluetooth Classic, Bluetooth Low Energy), and Zigbee.

The electronic device 100 may include a communicator for communicating with an external device. The communicator may be connected to a network via wireless communication or wired communication. In the wireless communication, for example, at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM) may be used as a cellular communication protocol. In addition, the wireless communication may include, for example, local area communication. The local area communication may include, for example, at least one of wireless fidelity direct (Wi-Fi direct), Bluetooth, near field communication (NFC), and Zigbee. The wired communication may include, for example, at least one of universal serial bus (USB), high definition multimedia interface (HDMI), recommended standard 232 (RS-232), or plain old telephone service (POTS). The network is a communication network and may include, for example, at least one of a computer network (e.g., LAN or WAN), the Internet, or a telephone network.

The electronic device 100 may communicate with a remote controller via the communicator. This remote controller is a device capable of receiving motion inputs and the electronic device 100 may receive a signal corresponding to a movement of the remote controller from the remote controller. The processor 130 may obtain information regarding a sketch based on the received signal. In other words, a sketch drawn by the user in the air using the remote controller may be input to the electronic device 100. Such a sketch may be displayed via the display 120.

The processor 130 may be an element for controlling general operations of the electronic device 100. For example, the processor 130 may operate an operating system or an application program to control a plurality of hardware or software elements connected to the processor 130 and perform various data processing and operations. The processor 130 may be a central processing unit (CPU) or a graphics processing unit (GPU) or both of them. The processor 130 may be implemented at least one of a general processor, a digital signal processor, an application specific integrated circuit (ASIC), a system on chip (SoC), a microcomputer (MICOM), and the like.

The processor 130 may perform the operations of the electronic device 100 according to the various embodiments of the disclosure by executing computer executable instructions stored in the memory 120. The processor 130 may enable the electronic device 100 to perform the functions according to the embodiments described with reference to FIGS. 1 to 8.

As an example, the processor 130 may perform the next operation by executing the computer executable instructions stored in the memory 110. Specifically, the processor 130 may obtain the information regarding the sketch drawn by the user and control the display 120 to display the sketch. For example, the processor 130 may control the display 120 to display the sketch as illustrated in FIGS. 3 to 8.

The processor 130 may obtain at least one machine-generated image based on the sketch drawn by the user using the artificial intelligence model trained by the artificial intelligence algorithm.

The processor 130 may control the display 120 to display the at least one obtained machine-generated image. For example, the processor 130 may control the display 120 to display the machine-generated image as illustrated in FIGS. 5 to 8.

The processor 130 may receive a user command for selecting one of the at least one machine-generated image displayed on the display 120 and search for at least one content corresponding to the image selected in accordance with the user command.

The processor 130 may search for a content corresponding to the machine-generated image using the artificial intelligence model for content search trained by the artificial intelligence algorithm.

The processor 130 may search for a content stored in the memory 110 of the electronic device 100 or a content provided from the Internet. The content to be searched for may be any digital information such as a photograph, a video, an application, a news, an e-book, a film, an animation, and the like.

According to an embodiment, the user may designate a search range. For example, the processor 130 may receive a folder designation command from the user and search for a content in a folder corresponding to the folder designation command. As another example, the processor 130 may receive a content type designation command from the user and search for a content from the designated content type.

The processor 130 may control the display 120 to display at least one UI element for selecting a category based on information obtained by classifying a plurality of contents to be searched for. For example, the processor 130 may control the display 120 to display the UI elements 720 as illustrated in FIG. 7. The processor 130 may input the information regarding the category corresponding to the UI element selected by the user among the at least one UI element and the sketch drawn by the user displayed on the display 120 to the artificial intelligence model and obtain at least one image refined from the sketch as a target belonging to the category corresponding to the selected UI element.

In this case, the processor 130 may search for at least one content corresponding to the information regarding the category corresponding to the UI element selected by the user and the machine-generated image selected by the user. For example, the processor 130 may input the information regarding the category corresponding to the UI element selected by the user and the machine-generated image selected by the user to the artificial intelligence model for content search and search for a content belonging to the category corresponding to the UI element selected by the user.

In addition, the processor 130 may input the information regarding the plurality of categories obtained by classifying the plurality of contents to be searched for and the sketch drawn by the user to the artificial intelligence model and obtain the plurality of images refined from the sketch with respect to each of the plurality of categories. The processor 130 may control the display 120 to display the plurality of images obtained as described above for each category.

The processor 130 may provide at least one searched content. For example, the processor 130 may control the display 120 to display searched contents as illustrated in FIGS. 5 to 8.

Meanwhile, if the artificial intelligence model is used in the content search, the processor 130 may retrain the artificial intelligence model used in the content search based on the selection of the user with respect to any one of the at least one searched and provided content.

The operations of the embodiments described above may be implemented via a plurality of devices. The description regarding this will be described with reference to FIG. 10.

Figure 10:
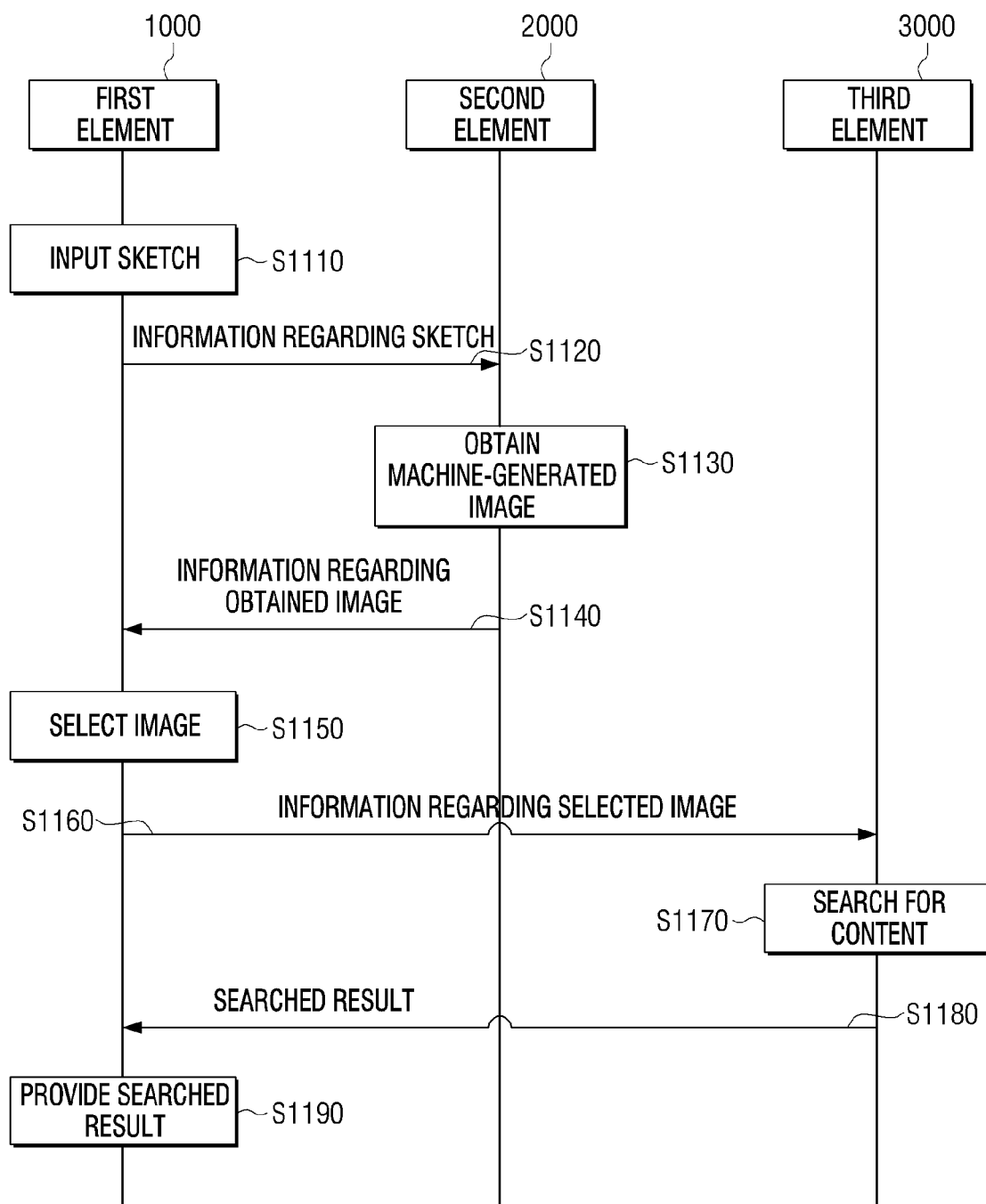
FIG. 10 is a flowchart of a network system using a recognition model according to an embodiment.

FIG. 10 is a flowchart of a network system using another artificial intelligence model according to various embodiments.

Referring to FIG. 10, a network system using the artificial intelligence model may include at least two of a first element 1000, a second element 2000, and a third element 3000. For example, the first element 1000 may be an electronic device such as a desktop PC, a smartphone, a tablet PC, or the like, the second element 2000 may be a server storing an artificial intelligence model, a database, and the like for obtaining a machine-generated image, and the third element 3000 may be a server storing an artificial intelligence model, a database, and the like for searching for a content based on an image. Alternatively, the first element 1000 may be a general-purpose processor, and the second element 2000 and the third element 3000 may be artificial intelligence dedicated processors. Alternatively, the first element 1000 may be at least one application and the second element 2000 and the third element 3000 may be an operating system (OS). In other words, the second element 2000 and the third element 3000 may be elements more integrated or specialized, or has less delay, improved performance, or a larger amount of resources than the first element 1000, and may be, for example, elements which are able to effectively rapidly process a large amount of processes required when generating, updating, or applying a model, compared to the first element 1000.

An interface for transmitting and receiving data between the first element 1000, the second element 2000, and the third element 3000 may be defined. For example, an application program interface (API) including the learning data to be applied to the model as a factor value (or medium value or transfer value) may be defined. The API may be defined as an assembly of sub-routines or functions which may be invoked for certain processing of another protocol (e.g., protocol defined on the second element 2000) from any one protocol (e.g., protocol defined on the first element 1000). In other words, an environment in which the operation of the other protocol is able to be performed on any one protocol may be provided through the API.

Referring to FIG. 10, first, the first element 1000 may receive a sketch (S1110). The first element 1000 may receive the sketch via various input devices such as a keyboard, a touch screen, a remote controller, and the like. Further, the first element 1000 may receive selection of a category.

The first element 1000 may transmit information regarding the input sketch to the second element 2000 (S1120). In addition, the first element 1000 may transmit information regarding the sketch and information regarding the selected category to the second element 2000.

The second element 2000 may input the sketch to an artificial intelligence model trained by an artificial intelligence algorithm and obtain at least one machine-generated image based on the sketch (S1130). The second element 2000 may store an artificial intelligence model and a database including various pieces of data necessary for image generation. When receiving the information regarding the category from the first element 1000, the second element 2000 may obtain an image refined from the sketch as a target belonging to the category corresponding to the information regarding the category.

The second element 2000 may transmit information regarding the at least one machine-generated image to the first element 1000 (S1140). In this case, for example, the second element 2000 may transmit the machine-generated image to the first element 1000 in a file form. In another example, the second element 2000 may transmit information regarding a storage address (e.g., URL address) of the machine-generated image to the first element 1000.

The first element 1000 may receive user selection regarding any one of the at least one image received from the second element 2000 (S1150). For example, the first element 1000 may display the at least one machine-generated image received through the second element 2000 via a display included therein or an external display device. The user may select an image to be used for search among the at least one displayed image.

The first element 1000 may transmit information regarding the selected image to the third element 3000 (S1160).

The third element 3000 may input the image to the artificial intelligence model trained by the artificial intelligence algorithm and search for at least one content corresponding to the image (S1170). The third element 3000 may store the artificial intelligence model a database including various pieces of data necessary for content search.

The third element 3000 may transmit a searched result of the content to the first element 1000 (S1180). The first element 1000 may provide a content based on the received searched result (S1190). For example, the first element 1000 may display searched contents via a display included therein or an external display device. The user may select a desired content among the displayed contents.

The artificial intelligence model described in the disclosure may be a determination model trained based on the artificial intelligence algorithm, for example, a model based on a neural network. The trained artificial intelligence model may be designed to simulate a brain structure of human on a computer and may include a plurality of network nodes including weights and simulating neurons of the neural network of human. The plurality of network nodes may form connections to each other to simulate a synaptic activity in that the neurons transmit and receive signals through synapse. In addition, the trained artificial intelligence model may include, for example, a neural network model or a deep learning model developed from the neural network model. In a deep learning model, a plurality of network nodes may be positioned at depths (or on layers) different from each other and may transmit and receive data according to the convolution connection. Examples of the trained artificial intelligence model may include a deep neural network (DNN), a recurrent neural network (RNN), and a bidirectional recurrent deep neural network (BRDNN), but there is no limitation thereto.

According to an embodiment, the first element 1000 may use a personal assistant program which is an artificial intelligence dedicated program (or artificial intelligence agent). The personal assistant program is a dedicated program to provide a service based on artificial intelligence and may be executed by a general-purpose processor of the related art or a separate AI dedicated processor.

Specifically, when a predetermined user input (e.g., touch of an icon corresponding to a personal assistant chatbot, a user's voice containing a predetermined word, and the like) is input or a button (e.g., button for executing the artificial intelligence agent) provided on the first element 1000 is pressed, the artificial intelligence agent may be operated (or executed). The artificial intelligence agent may transmit the sketch drawn by the user to the second element 2000 and provide the machine-generated image received from the second element 2000.

When the predetermined user input is detected on a screen or the button (e.g., button for executing the artificial intelligence agent) provided on the first element 1000 is pressed, the artificial intelligence agent may be operated. In addition, the artificial intelligence agent may be executed in advance before the predetermined user input is detected or the button provided on the first element 1000 is selected. In this case, after the predetermined user input is detected or the button provided on the first element 1000 is selected, the artificial intelligence agent of the first element 1000 may obtain a machine-generated image based on the sketch and perform content search. In addition, the artificial intelligence agent may be in a standby state before the predetermined user input is detected or the button provided on the first element 1000 is selected. Herein, the standby state may be a state for detecting a predefined user input received to control a start of the operation of the artificial intelligence agent. When the predetermined user input is detected or the button provided on the first element 1000 is selected while the artificial intelligence agent is in the standby state, the first element 1000 may operate the artificial intelligence agent.

According to another embodiment of the disclosure, the first element 1000 may directly obtain the machine-generated image using the artificial intelligence model and perform the content search based on the image. The artificial intelligence agent may perform the operations of the second element 2000 and the third element 3000.

Figure 11:
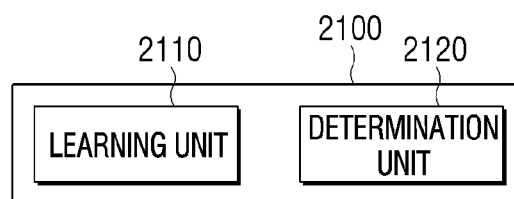
FIG. 11 is a block diagram for illustrating the electronic device for training and using a recognition model according to an embodiment.

FIG. 11 is a block diagram for illustrating a configuration of an electronic device for training and using an artificial intelligence model according to an embodiment.

Referring to FIG. 11, an electronic device 2100 may include at least one of a learning unit 2110 and a determination unit 2120. The electronic device 2100 of FIG. 11 may correspond to the electronic device 100 of FIG. 9 and the second element 2000 or the third element 3000 of FIG. 10.

The learning unit 2110 may generate or train an artificial intelligence model having a criterion for obtaining at least one machine-generated image based on a sketch using learning data. The learning unit 2110 may generate the artificial intelligence model having a determination criterion using the collected learning data.

In an example, the learning unit 2110 may generate, train, or retrain the artificial intelligence model to obtain an image refined from the sketch using a rough sketch as the learning data. In addition, the learning unit 2110 may generate, train, or retrain the artificial intelligence model for searching for a content corresponding to the image using the image as the learning data.

The determination unit 2120 may generate the image based on the sketch using predetermined data as input data of the trained artificial intelligence model. In addition, the determination unit 2120 may search for a content corresponding to the image.

In an example, the determination unit 2120 may obtain an image refined from the sketch using the rough sketch as the input data of the trained artificial intelligence model. In another example, the determination unit 2120 may search for an image having high similarity to the input image using the image as the input data of the artificial intelligence model.

At least a part of the learning unit 2110 and at least a part of the determination unit 2120 may be implemented as a software module or manufactured as at least one hardware chip to be mounted on the second element 2000 and the third element 3000. For example, at least one of the learning unit 2110 and the determination unit 2120 may be manufactured in a form of a dedicated hardware chip for artificial intelligence (AI) and may be manufactured as a part of the generic-purpose processor of the related art (e.g., CPU or application processor) or a graphics dedicated processor (e.g., GPU) and mounted on various electronic devices described above. The dedicated hardware chip for artificial intelligence is a dedicated processor specialized in probability calculation and may rapidly process the calculation operations in the artificial intelligence field such as machine learning with higher performance of parallel processing than the generic-purpose processor of the related art. If the learning unit 2110 and the determination unit 2120 are implemented as software module (or program module including instructions), the software module may be stored in a non-transitory computer readable medium. In this case, the software module may be provided by an operating system (O/S) or provided by a predetermined application. In addition, a part of the software module may be provided by the operating system (O/S) and the other part may be provided by the predetermined application.

In this case, the learning unit 2110 and the determination unit 2120 may be mounted on one electronic device or may be mounted on separate electronic devices, respectively. In addition, the learning unit 2110 and the determination unit 2120 may be connected in a wired or wireless manner so that the learning unit 2110 may provide constructed model information to the determination unit 2120 and the data input to the determination unit 2120 may be provided to the learning unit 2110 as additional learning data.

Figure 12:
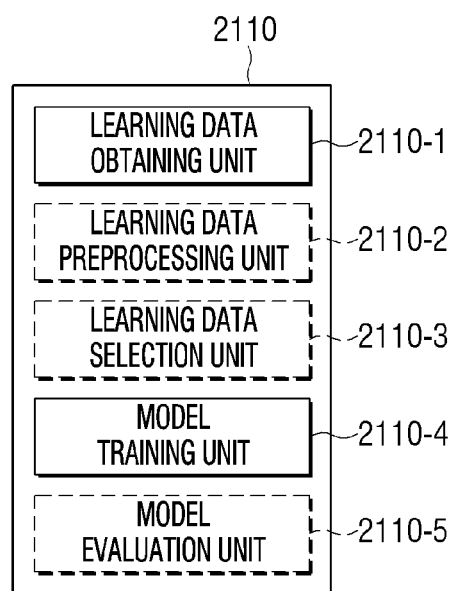
FIGS. 12 and 13 are block diagrams for illustrating a learning unit and a determination unit according to various embodiments.
Figure 13:
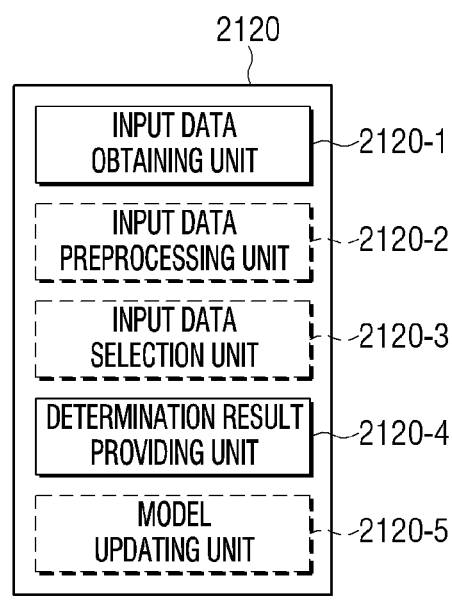

FIGS. 12 to 13 are block diagrams of the learning unit 2110 and the determination unit 2120 according to various embodiments.

Referring to FIG. 12, the learning unit 2110 according to some embodiments may include a learning data obtaining unit 2110-1 and a model training unit 2110-4. In addition, the learning unit 2110 may further optionally include at least one of a learning data preprocessing unit 2110-2, a learning data selection unit 2110-3, and a model evaluation unit 2110-5.

The learning data obtaining unit 2110-1 may obtain learning data necessary for the artificial intelligence model for obtaining an image refined from the sketch. In addition, the learning data obtaining unit 2110-1 may obtain learning data necessary for the artificial intelligence model for searching for a content corresponding to the image. According to an embodiment of the disclosure, the learning data obtaining unit 2110-1 may obtain a sketch image or a machine-generated image as learning data. The learning data may be data collected or tested by the learning unit 2110 or a manufacturer of the learning unit 2110.

The model training unit 2110-4 may train the artificial intelligence model to have a criterion for generating an image refined from the sketch using the learning data. In addition, the model training unit 2110-4 may train the artificial intelligence model to have a criterion for searching for a content corresponding to an image using the learning data. For example, the model training unit 2110-4 may train the artificial intelligence model through supervised learning. In addition, the model training unit 2110-4 may train the artificial intelligence model, for example, through unsupervised learning for self-training using learning data without particular supervision. For example, the model training unit 2110-4 may train the artificial intelligence model using a generative adversarial network (GAN) technology or a variational auto-encoder (VAE) technology. In addition, the model training unit 2110-4 may train the artificial intelligence model, for example, through reinforcement learning using a feedback whether a determination result according to the training is correct. In addition, the model training unit 2110-4 may train the artificial intelligence model, for example, using a learning algorithm containing error back-propagation or gradient descent.

The model training unit 2110-4 may perform training regarding a selection criterion regarding which learning data is to be used.

If the number of artificial intelligence models constructed in advance is more than one, the model training unit 2110-4 may determine an artificial intelligence model having basic learning data with higher relevance to the input learning data as an artificial intelligence model to be trained. In this case, the basic learning data may be classified in advance for each type of data and the artificial intelligence model may be constructed in advance for each type of data. For example, the basic learning may be classified in advance based on various criteria such as a region where the learning data is generated, time when the learning data is generated, a size of the learning data, a genre of the learning data, a creator of the learning data, a type of an object in the learning data, and the like.

When the artificial intelligence model is trained, the model training unit 2110-4 may store the trained artificial intelligence model. For example, the model training unit 2110-4 may store the trained artificial intelligence model in the memory 110 of the electronic device 100, a memory of the second element 2000, or a memory of the third element 3000.

The learning unit 2110 may further include the learning data preprocessing unit 2110-2 and the learning data selection unit 2110-3 in order to improve a determination result of the artificial intelligence model or save resources or time necessary for providing the artificial intelligence model.

The learning data preprocessing unit 2110-2 may preprocess the obtained data so that the obtained data is used in the training for obtaining the image refined from the sketch. The learning data preprocessing unit 2110-2 may process the obtained data so that the obtained data is used in the training for searching for a content corresponding to the image.

The learning data selection unit 2110-3 may select data necessary for the training from data obtained by the learning data obtaining unit 2110-1 or the data preprocessed by the learning data preprocessing unit 2110-2. The selected learning data may be provided to the model training unit 2110-4. The learning data selection unit 2110-3 may select learning data necessary for training from the obtained or preprocessed data according to a predetermined selection criterion. In addition, the learning data selection unit 2110-3 may select learning data according to the predetermined selection criterion according to the training performed by the model training unit 2110-4.

The learning unit 2110 may further include the model evaluation unit 2110-5 in order to improve a determination result of the artificial intelligence model.

The model evaluation unit 2110-5 may input evaluation data to the artificial intelligence model and may cause the model training unit 2110-4 to perform the training again, if the determination result output from the evaluation data does not satisfy the predetermined criterion. In such a case, the evaluation data may be predefined data for evaluating the artificial intelligence model.

For example, if a number or a rate of pieces of the evaluation data having inaccurate determination results, among determination results of the trained artificial intelligence model regarding the evaluation data, exceeds a predetermined threshold value, the model evaluation unit 2110-5 may evaluate that the predetermined criterion is not satisfied.

If the number of trained artificial intelligence models is more than one, the model evaluation unit 2110-5 may evaluate whether each of the trained artificial intelligence models satisfies the predetermined criterion, and determine a model satisfying the predetermined criterion as a final artificial intelligence model. In this case, if the number of models satisfying the predetermined criterion is more than one, the model evaluation unit 2110-5 may determine any one or a predetermined number of models set in advance in the order of high evaluation scores as final artificial intelligence models.

Referring to FIG. 13, the determination unit 2120 according to some embodiments may include an input data obtaining unit 2120-1 and a determination result providing unit 2120-4.

In addition, the determination unit 2120 may further optionally include at least one of an input data preprocessing unit 2120-2, an input data selection unit 2120-3, and a model updating unit 2120-5.

The input data obtaining unit 2120-1 may obtain data necessary for obtaining the machine-generated image based on the sketch. The determination result providing unit 2120-4 may obtain the machine-generated image based on the sketch by applying the input data obtained by the input data obtaining unit 2120-1 to the trained artificial intelligence model as an input value.

In addition, the input data obtaining unit 2120-1 may obtain data necessary for searching for a content corresponding to the image. The determination result providing unit 2120-4 may search for the content corresponding to the image by applying the input data obtained by the input data obtaining unit 2120-1 to the trained artificial intelligence model as an input value.

The determination result providing unit 2120-4 may obtain the determination result by applying data preprocessed by the input data preprocessing unit 2120-2 or selected by the input data selection unit 2120-3 which will be described below to the artificial intelligence model as an input value.

In an embodiment, the determination result providing unit 2120-4 may obtain at least one machine-generated image based on the sketch by applying the information regarding the sketch obtained by the input data obtaining unit 2120-1 to the trained artificial intelligence model.

The determination unit 2120 may further include the input data preprocessing unit 2120-2 and the input data selection unit 2120-3 in order to improve the determination result of the artificial intelligence model or save resources or time necessary for providing the determination result.

The input data preprocessing unit 2120-2 may preprocess the obtained data so that the obtained data is used for obtaining the at least one machine-generated image based on the sketch. The input data preprocessing unit 2120-2 may process the obtained data in a predefined format so that the determination result providing unit 2120-4 easily uses the obtained data for obtaining the at least one machine-generated image based on the sketch. In addition, the input data preprocessing unit 2120-2 may preprocess the obtained data so that the obtained data is used for searching for a content corresponding to the image.

The input data selection unit 2120-3 may select data necessary for providing a response from the data obtained by the input data obtaining unit 2120-1 or the data preprocessed by the input data preprocessing unit 2120-2. The selected data may be provided to the determination result providing unit 2120-4. The input data selection unit 2120-3 may select some or all pieces of the obtained or preprocessed data according to predetermined selection criteria for providing a response. In addition, the input data selection unit 2120-3 may select data according to the predetermined selection criteria by the training of the model training unit 2110-4.

The model updating unit 2120-5 may control the artificial intelligence model to be updated based on the evaluation of the determination result provided by the determination result providing unit 2120-4. For example, the model updating unit 2120-5 may request the model training unit 2110-4 to additionally train or update the artificial intelligence model by providing the determination result provided by the determination result providing unit 2120-4 to the model training unit 2110-4. Particularly, the model updating unit 2120-5 may retrain the artificial intelligence model based on feedback information according to a user input.

The content searching method of the embodiments of the disclosure may exhibit the effects as below. Since the way of drawing an image varies depending on users, an image drawn by a user may not be appropriate to be directly used for the content search, and it is also inconvenient for the user to put efforts to draw an image used for search. As in the embodiments of the disclosure, according to the method for causing the user to draw a rough sketch and generating an image refined from the sketch drawn by the user using the artificial intelligence model, it is possible to improve convenience, since the user may only roughly draw a sketch, and it is possible to ensure consistency of the content search, since the machine-generated images are generated based on a specific criterion.

The various embodiments described above may be implemented as software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. According to the implementation in terms of software, the embodiments such as procedures and functions described in this specification may be implemented as separate software modules. Each of the software modules may perform one or more functions and operations described in this specification.

The methods according to various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method for controlling an electronic device, the method comprising:
   receiving a sketch drawn by a user;
   obtaining at least one machine-generated image for each of a plurality of different image categories based on the sketch using an artificial intelligence model for image generating trained by an artificial intelligence algorithm;
   simultaneously displaying the at least one obtained machine-generated image for each of the image categories;
   receiving a user command for selecting one machine-generated image from the simultaneous display of the at least one displayed machine-generated image for each of the image categories and searching for at least one content corresponding to the selected image among a plurality of contents; and
   providing the at least one searched content,
   wherein the image categories comprise a nature category, a building category, and a person category.

2. The method according to claim 1, wherein the searching comprises:
   searching for the at least one content corresponding to the selected image from among the plurality of contents stored in the electronic device.

3. The method according to claim 2, wherein the obtaining comprises:
   obtaining the at least one machine-generated image for each of the plurality of different image categories by inputting classification information regarding the plurality of image categories and the sketch to the artificial intelligence model.

4. The method according to claim 1, wherein the artificial intelligence model is trained by a generative adversarial network (GAN) or a variational auto-encoder (VAE).

5. The method according to claim 1, wherein the searching comprises:
   searching for the at least one content corresponding to the selected image using an artificial intelligence model for content search trained by the artificial intelligence algorithm.

6. The method according to claim 5, further comprising:
   receiving a content selection for selecting from among the at least one provided content; and
   retraining the artificial intelligence model for content search based on the selected content.

7. The method according to claim 1, wherein the receiving the sketch drawn by the user comprises:
   receiving a signal corresponding to a movement of a remote controller and obtaining information regarding the sketch based on the received signal.

8. An electronic device comprising:
   memory storing computer executable instructions;
   a display; and
   at least one processor, wherein one or more of the at least one processor is configured to execute the computer executable instructions to:
      obtain at least one machine-generated image for each of a plurality of different image categories based on a sketch drawn by a user using an artificial intelligence model for image generating trained by an artificial intelligence algorithm,
      control the display to simultaneously display the at least one obtained machine-generated image for each of the image categories,
      receive a user command for selecting one machine-generated image from the simultaneous display of the at least one displayed machine-generated image for each of the image categories, and search for at least one content corresponding to the selected image among a plurality of contents, and
      provide the at least one searched content,
   wherein the image categories comprise a nature category, a building category, and a person category.

9. The device according to claim 8, wherein one or more of the at least one processor is configured to search for the at least one content corresponding to the selected image from among the plurality of contents stored in the electronic device.

10. The device according to claim 9, wherein one or more of the at least one processor is configured to obtain the at least one machine-generated image for each of the plurality of different image categories by inputting classification information regarding the plurality of image categories and the sketch to the artificial intelligence model.

11. The device according to claim 8, wherein the artificial intelligence model is trained by a generative adversarial network (GAN) or a variational auto-encoder (VAE).

12. The device according to claim 8, wherein one or more of the at least one processor is configured to search for the at least one content corresponding to the selected image using an artificial intelligence model for content search trained by the artificial intelligence algorithm.

13. The device according to claim 8, wherein one or more of the at least one processor is configured to:
   receive a content selection for selecting from among the at least one provided content; and
   retrain the artificial intelligence model for content search based on the selected content.

14. The device according to claim 8, wherein one or more of the at least one processor is configured to receive a signal corresponding to a movement of a remote controller and obtain information regarding the sketch based on the received signal.

* * * * *